United States Patent [19]
Takakuwa et al.

[11] Patent Number: 6,162,519
[45] Date of Patent: Dec. 19, 2000

[54] OPTICAL DISC AND PROCESS FOR THE PRODUCTION OF THE SAME, AND PROCESS FOR THE PRODUCTION OF SHEET MATERIAL

[75] Inventors: Atsushi Takakuwa; Takao Nishikawa; Satoshi Nebashi, all of Suwa, Japan

[73] Assignee: Seiko Epson Corporation, Tokyo, Japan

[21] Appl. No.: 09/029,717

[22] PCT Filed: Jul. 11, 1997

[86] PCT No.: PCT/JP97/02418

§ 371 Date: Mar. 9, 1998

§ 102(e) Date: Mar. 9, 1998

[87] PCT Pub. No.: WO98/02875

PCT Pub. Date: Jan. 22, 1998

[30] Foreign Application Priority Data

Jul. 11, 1996 [JP] Japan ................................. 8-182511
Feb. 6, 1997 [JP] Japan ................................. 9-023860

[51] Int. Cl.[7] .................................................. B32B 3/02
[52] U.S. Cl. .................. 428/64.1; 428/64.2; 428/64.4; 428/64.7; 428/913; 430/270.11; 430/495.1; 430/945; 264/1.34; 156/244.11
[58] Field of Search .................................. 428/64.1, 64.2, 428/64.4, 64.7, 412, 500, 913; 430/270.11, 495.1, 945; 264/1.33, 1.34; 156/244.11, 244.19, 244.25, 244.27

[56] References Cited

U.S. PATENT DOCUMENTS 5,480,596 1/1996 Okubo et al. ........................ 264/1.33
5,527,497 6/1996 Kanome et al. ..................... 264/1.33

FOREIGN PATENT DOCUMENTS

| 53-86756 | 7/1978 | Japan . |
| 61-68746 | 4/1986 | Japan . |
| 63-281240 | 11/1988 | Japan . |
| 2-236834 | 9/1990 | Japan . |
| 4-299937 | 10/1992 | Japan . |
| 4-310624 | 11/1992 | Japan . |
| 4-311833 | 11/1992 | Japan . |
| 5-62254 | 3/1993 | Japan . |

*Primary Examiner*—Elizabeth Evans
*Attorney, Agent, or Firm*—Oliff & Berridge, PLC

[57] ABSTRACT

To provide an optical disk with high mass producibility and excellent optical properties, mechanical precision, and mechanical strength, as well as a method for the simple and efficient manufacturing of this optical disk.

Comprises a substrate 101 of an extrusion molded sheet of a material consisting primarily of a polyolefin polymer which has been processed into a disk, and a data recording medium surface which consists of a photocuring resin layer 102 formed on the substrate 101 and on which bumps have been formed based on prescribed data.

22 Claims, 14 Drawing Sheets

102 PHOTOCURING RESIN LAYER
101 SUBSTRATE

201 MASTER

202 PHOTOCURING RESIN
201

203 FLAT SUBSTRATE
202A
201

203
202A

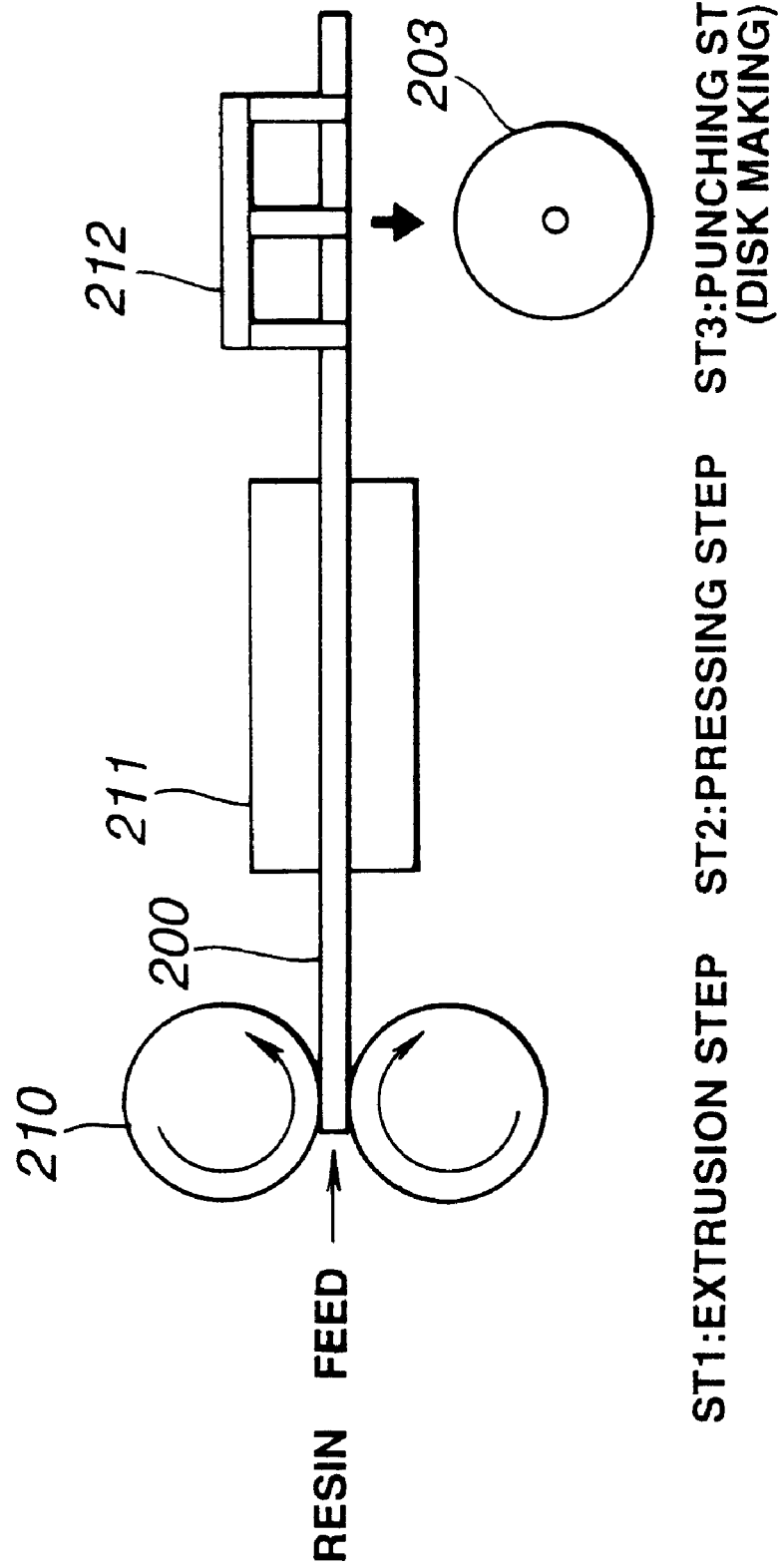

WITH PRESSING STEP

WITHOUT PRESSING STEP

WITH PRESSING STEP

WITHOUT PRESSING STEP

501 SILICON WAFER

502 PHOTORESIST APPLICATION
501

502 LASER CUTTING (EXPOSURE)
501

502 DEVELOPMENT
501

503 502 ETCHING
501

501 RESIST REMOVAL

SILICON WAFER
601

602
PHOTORESIST APPLICATION
601

602
LASER CUTTING (EXPOSURE)
601

602A
DEVELOPMENT
601

602A
603
ETCHING
601

RESIST REMOVAL
601

OPTICAL DISC AND PROCESS FOR THE PRODUCTION OF THE SAME, AND PROCESS FOR THE PRODUCTION OF SHEET MATERIAL

TECHNICAL FIELD

The present invention relates an optical disk and a method for manufacturing an optical disk.

BACKGROUND ART

Extrusion molding and photopolymerization are examples of typical conventional methods for manufacturing an optical disk. Extrusion molding is a method in which, for example, molten polycarbonate resin is extruded under high pressure into a mold containing a disk stamper, and the resin is then cured. Photopolymerization, on the other hand, is a method in which flat plastic plates with good optical properties are prepared, a photocuring resin that can be cured by ultraviolet rays is packed between a plate and a stamper, and the photocuring resin is then cured by ultraviolet irradiation.

A conventional example of photopolymerization has been disclosed in Japanese Laid-Open Patent Application 53-86756. In the method described in this publication, a pattern is transferred from a nickel master (hereinafter, "master" in the specification refers to that which corresponds to a stamper) manufactured by electroforming to polymethyl methacrylate, polycarbonate, or the like using ultraviolet ray-curing resin.

The aforementioned stamper is usually manufactured by coating a glass disk (glass negative) with a photoresist, followed by the exposure of the optical disk pattern using an exposure machine referred to as a laser cutting machine, development, and the thick electroformation of nickel on the pattern thus formed.

Optical disk masters featuring the use of silicon wafers have also been employed recently. In the method disclosed in Japanese Laid-Open Patent Application 61-68746, a silicon oxide is formed on a silicon wafer, a photoresist is applied thereon and exposed, the photoresist is developed, and the silicon oxide is then etched to form a master. In the method disclosed in Japanese Laid-Open Patent Application 4-299937, the silicon wafer is directly etched to form a master. In the method noted in Japanese Laid-Open Patent Applications 4-310624 and 4-311833, a master is manufactured using a silicon wafer so as to obtain an optical disk with better recording density. In the method disclosed in Japanese Laid-Open Patent Application 5-62254, an ultraviolet setting resin is used to transfer a pattern from a master consisting of a silicon wafer to a plastic substrate.

However, the aforementioned methods for manufacturing an optical disk by extrusion molding of polycarbonates have poor mass producibility because the disks are extrusion molded one at a time, and it is difficult to obtain high precision reproducibility.

Improved mass producibility has been attempted using extruded polycarbonate sheets which have been punched or the like and processed into the shape of disks. Polycarbonates have substantial optical anisotropy, however, and disks obtained by processing extrusion molded sheets have variable optical properties depending on the direction in which they are read by a pickup. That is, the optical properties vary along the concentric rings of the disk, precluding its use as an optical disk.

Although the use of acrylic with low optical anisotropy rather than polycarbonates results in good optical properties when disks are obtained by the aforementioned extrusion molding and processing, acrylics are highly moisture-absorbing, and the disks tend to suffer from deformation such as warping. Furthermore, when a reflective film, recording film, or the like is vacuum molded on the disk surface, it is extremely time-consuming to remove gas (particularly moisture) in the disk.

DISCLOSURE OF THE INVENTION

A first object of the present invention, which is intended to resolve the aforementioned conventional drawbacks, is to provide an optical disk with high mass producibility and excellent optical properties, mechanical precision, and mechanical strength.

A second object is to provide a method for the simple and efficient manufacture of this optical disk.

To achieve the first object, the present invention is intended to provide an optical recording medium provided with a substrate and a data recording surface which is formed on the substrate and on which bumps have been formed based on prescribed data, wherein the aforementioned substrate comprises an extrusion molded sheet, of a material composed primarily of a polyolefin polymer, which has been extruded in the form of a disk, and the aforementioned data recording surface has a setting resin layer.

Polyolefin polymers have the properties of low optical anisotropy and low moisture-absorption, so adopting such a structure affords an optical disk with high mass producibility as well as excellent optical properties and mechanical precision.

The absolute value of the double refraction of the aforementioned substrate in the horizontal direction is no more than 100 nm, and the absolute value of the double refraction in the thicknesswise direction is no more than 20 nm. The absolute value of the double refraction in the horizontal direction is preferably no more than 50 nm, and the absolute value of the double refraction in the thicknesswise direction is preferably no more than 10 nm.

When the absolute value of the double refraction of the aforementioned substrate in the horizontal direction is greater than 100 nm and the absolute value of the double refraction in the thicknesswise direction is greater than 20 nm, a resulting problem is the decrease in the recording and playback of the optical disk.

The absolute value of the angle of inclination in the aforementioned substrate can be set to no more than 0.6 degree. In the present invention, the "angle of inclination" is also referred to as "tilt," "slope warp," or "warp angle." The thicknesswise deformation of the aforementioned substrate can also be set to no more than 5%. The glass transition point of the aforementioned material can also be set to at least 80° C. and no more than 140° C.

When the angle of inclination of the aforementioned substrate is more than 0.6 degree, a problem that tends to occur is that stable recording and playback are no longer possible. The same problems occur when the thicknesswise deformation of the aforementioned substrate is more than 5%.

The aforementioned substrate should also be highly transparent (transmissivity of at least 90%). The aforementioned substrate should also have a low rate of moisture absorption and low moisture permeability (water absorption of no more than 0.01 wt % (24 hours at 23° C.) and a moisture permeability coefficient of no more than 0.1 (40° C., 90% RH). The aforementioned substrate should also be highly solvent resistant.

The aforementioned substrate can be obtained by processing a laminate of a plurality of the aforementioned sheets into the form of a disk. This results in even greater mechanical strength.

The laminate can be constructed in such a way that the molecular weight of the material constituting the first sheet is different than that of the material constituting the second sheet laminated in contact with the first sheet. The laminate can also be constructed of sheets with differing refractive indices. The laminate can also be composed of a plurality of sheets formed from materials with differing glass transition points.

The aforementioned setting resin layer can be composed of a photocuring resin layer or thermosetting resin layer.

To achieve the second of the aforementioned objects, the present invention is intended to provide a method for manufacturing an optical disk furnished with a substrate and with a data recording surface which is formed on the substrate and on which bump shapes have been formed based on prescribed data, wherein the method for manufacturing an optical disk comprises: the step of forming a material consisting primarily of a polyolefin polymer into a sheet by extrusion molding; the step of processing the extrusion molded sheet into a disk; the step of interposing a setting resin between the substrate surface and the bumpy surface of a master on which the negative pattern of the bumps has been formed, after the forming step; the step of placing or of placing and pressing the bumpy surface of the master on the substrate surface with the setting resin interposed therebetween; and the step of curing the setting resin, after the placing step or placing and pressing step.

The invention is also intended to provide a method for manufacturing an optical disk comprising: the step of forming a material consisting primarily of a polyolefin polymer into a sheet by extrusion molding; the step of interposing a setting resin between the substrate surface and the bumpy surface of a master on which the negative pattern of the bumps has been formed, after the sheet has been formed; the step of placing or of placing and pressing the bumpy surface of the master on the substrate surface with the setting resin interposed therebetween; the step of curing the setting resin, after the placing step or placing and pressing step; and the step of processing the cured setting resin into the form of a disk.

These two manufacturing methods allow an optical disk with the aforementioned structure to be readily and efficiently manufactured.

The two aforementioned methods can further comprise a step for laminating a plurality of the aforementioned sheets. This laminating step can comprise a step in which a second sheet composed of a material with different molecular weight than that of the material constituting a first sheet is laminated on the first sheet. The aforementioned laminating step can also comprise the step of laminating sheets with different refractive indices. The laminating step can further comprise the step of laminating sheet consisting of a material with glass transition points that differ from each other.

A master made of silicon or nickel can be used as the aforementioned master.

Pressing should be preferably used when the aforementioned sheet is formed into a sheet. Pressing allows the sheet to be made flat to a suitable thickness. The number of pressings may be one or more. A fewer number of pressings allows the time needed for the manufacture of the optical disk to be shortened.

The pressing step should be carried out at a temperature of 100 to 200 degrees in the atmosphere or a nitrogen atmosphere. This allows the optical and mechanical properties of the sheet material to be further improved. The optical properties are improved because the pressing action limits the orientation of the polyolefin polymer serving as the sheet material and lowers the double refraction and. The mechanical properties are improved because pressing improves the slope warpage or warping immediately following extrusion.

The pressing step should include a plurality of pressings. A greater number of pressings allows the sheet thickness to be flattened to a more suitable degree and also allows the optical properties such as the double refraction and the mechanical properties such as the slope warp or warpage (tilt) to be improved.

The manufacturing method is not limited to optical disks and can be used to manufacture sheet materials. That is, the method for manufacturing a sheet material comprises the step of forming a material consisting primarily of a polyolefin polymer into the form of a sheet by extrusion molding, and the step of pressing the entire material that has been formed into a sheet by the preceding step. The pressing step at this time should be managed at a temperature of 100 to 200 degrees in the atmosphere or a nitrogen atmosphere. This allows a sheet material with better optical and mechanical properties to be manufactured.

BRIEF DESCRIPTION OF THE DRAWINGS

FIG. 3 is an illustration of a device for manufacturing a substrate for the optical disk pertaining to the present invention;

BEST MODE FOR CARRYING OUT THE INVENTION

Preferred embodiments of the present invention are described below with reference to figures.

Embodiment 1

Figure 1:
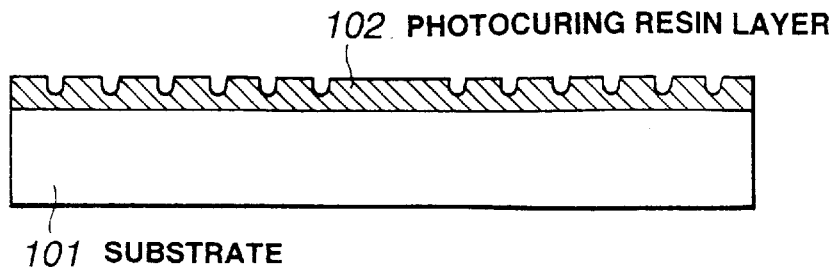
FIG. 1 is a cross section of an optical disk in Embodiment 1 of the present invention.

FIG. 1 is a cross section of the optical recording medium (optical disk) in a preferred embodiment of the present invention, and FIG. 2 is a cross section depicting the stages of the steps for manufacturing the optical disk using a master made of a silicon wafer. The description of the protective film, reflecting film, and the like is omitted in FIG. 1.

In this embodiment of the present invention, the manufacture of an optical recording medium in the form of a disk, that is, an optical disk, is described, but the shape of the optical recording medium is not limited to disks and may also be in the form of a square or the like as well as curved instead of flat.

As indicated in FIG. 1, the optical disk pertaining in this embodiment of the present invention is composed of a substrate 101 which is obtained by punching an extruded molded sheet of a material consisting of a polyolefin polymer into the form of a disk, and a photocuring resin layer 102 which is formed on the substrate 101 and on which a pattern (such as pits or grooves) are formed based on prescribed data. An optical disk specifically used for playback is manufactured by forming a reflecting film and a protective film for protecting the reflecting film, in that order, on the substrate 101. Photomagnetic disks capable of recording and playback are manufactured by forming a protective film, photomagnetic recording film, and reflecting film, in that order, on the substrate 101.

Optical Disk Manufacturing Steps

The method for manufacturing an optical disk having this structure is described below according to the steps depicted in FIG. 2.

Figure 2A:
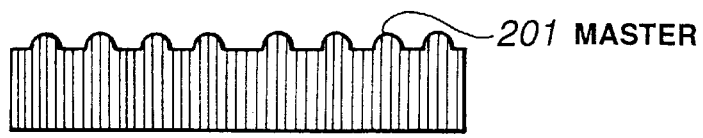
FIGS. 2A–2D are cross sections depicting the stages of the steps for manufacturing the optical disk in Embodiment 1 of the present invention; A illustrates the molding step, B illustrates the step for applying the photocuring resin, C illustrates the sheet pressing step, and D illustrates the master release step.

First, in the step depicted in FIG. 2A, the optical disk master 201 is manufactured by forming a silicon wafer on which the desired bump pattern to be transferred to the data recording surface of the optical disk has been formed by the step depicted in FIG. 16 or 17.

Figure 2B:

Next, in the step depicted in FIG. 2B, a photocuring resin 202 that is cured by ultraviolet irradiation is applied on the master 201 formed in the step depicted in FIG. 2A.

Figure 2C:
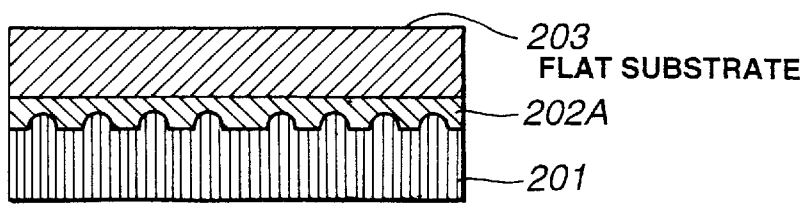

Next, in the step depicted in FIG. 2C, a flat substrate 203 obtained by punching an extrusion molded sheet of a material consisting primarily of a polyolefin polymer into the shape of a disk is placed on the photocuring resin 202 applied in the previous step, and is pressed. The photocuring resin 202 thus fills in the recesses of the bumps formed on the surface of the master 201, and the bump configuration of the master is accurately transferred to the photocuring resin 202. Ultraviolet rays are then radiated through the flat substrate 203 onto the photocuring resin 202 to cure the photocuring resin 202, and a photocuring resin layer 202A on which the aforementioned bump configuration has been formed is thus formed on the flat substrate 203.

Figure 2D:
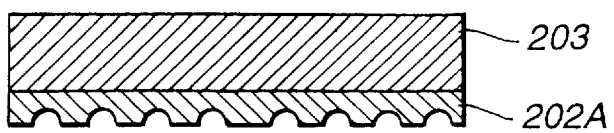

Then, in the step depicted in FIG. 2D, the master 201 is released from the photocuring resin layer 202A. A photocuring resin layer 202A with the prescribed bump pattern formed thereon is thus formed on the flat substrate 203.

A desired step such as the formation of a reflecting film or a protective layer is then carried out to complete the optical disk.

Substrate Manufacturing Steps

The steps for manufacturing the aforementioned flat substrate 203 are described below. FIG. 3 is a view of a device for manufacturing a substrate. As shown in this figure, the device for manufacturing the substrate in the present invention comprises an extruder 210, a pressing device 211, and a punching device 212. The substrate manufacturing steps are described below.

Step ST1 (Extrusion Step): In the extrusion step, a polyolefin polymer resin which has been rendered fluid upon being heated and pressed in an extruder not shown in the figure is first fed to the extruder 210. The resin fed to the extruder 210 is continuously extruded from a die and molded into a sheet with a virtually constant thickness. Flat plates may be used for the molding instead of the rollers shown in the figure.

Step ST2 (Pressing Step): In the pressing step, more pressure is exerted on the extrusion molded sheet to change the properties. The number of pressings may be one or more. A fewer number of pressings allows the time needed to manufacture the optical disk to be shortened. On the other hand, a greater number of pressings allows the sheet thickness to be flattened to a more suitable degree and also allows the optical properties such as the double refraction and the mechanical properties such as the slope warp or warpage (tilt) to be improved. That is, the suitable number of pressings should be determined in view of the limits on the cost of the optical disk as well as the optical and mechanical properties required of the optical disk.

Figure 4A:
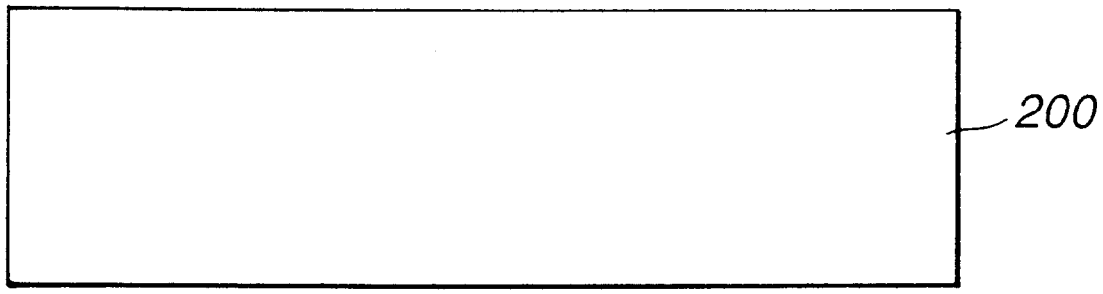
FIGS. 4A–4B are plans of a sheet in Embodiment 1 of the present invention.

FIG. 4A depicts the appearance of the molded sheet 200. The pressing should be carried out at a temperature of 100 to 200° C. in the atmosphere or a nitrogen atmosphere. This allows the optical properties such as the double refraction and the mechanical properties such as the slope warp or warpage (tilt) of the optical disk to be vastly improved. Since the double refraction is the most important property required of the resin used for the optical disk, improvements in the double refraction are important. In photomagnetic rewritable optical disks, for example, data is recorded and played back by making use of the slight rotary polarization referred to as the Kerr effect. When the substrate has a substantial double refraction, the double refraction considerably affects the rotary polarization of laser light, making it impossible to distinguish whether the signals read from the optical disk are the result of displacement of the rotary polarization based on actual data or displacement of the rotary polarization based on the double refraction of the substrate.

Specifically, the magnitude of the double refraction is determined by the molecular structure and molecular orientation of the polymer. The relation is expressed by the following equation, where n is the double refraction of the polymer, f is the orientation coefficient, and n0 is the inherent refractive index of the polymer.

$$n = f n0$$

In the above equation, n0 is expressed as a function of the difference between the polarizability in the direction of the molecular chain of the monomer units of the polymer and the direction perpendicular thereto, so the inherent value is determined for each polymer. The orientation coefficient f, meanwhile, tends to be governed by the behavior of the polymer in a molten state, and is thus largely dependent on the molding conditions of the sheet. Here, when pressing is carried out, as in the present embodiment, the polymer orientation is limited, and the orientation coefficient f is smaller. In short, pressing improves the double refraction.

Figure 4B:
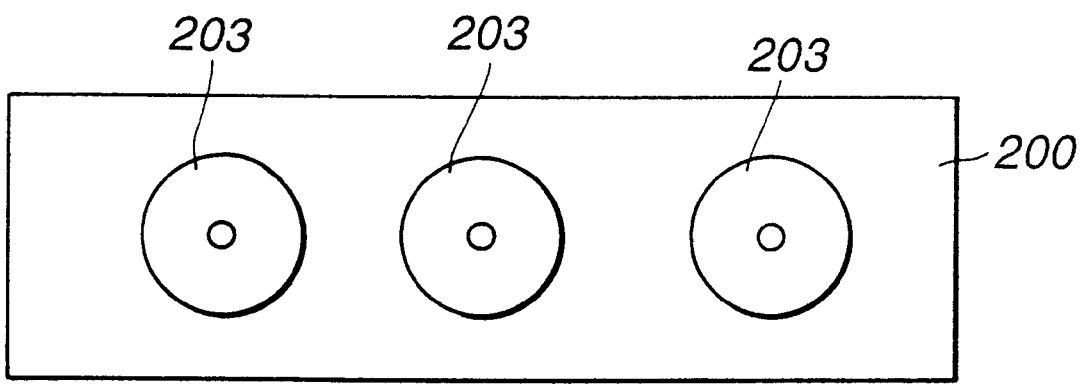

Step ST3 (Punching Step): The sheet obtained by extrusion molding is then punched into the form of a disk, as shown in FIG. 4B, to obtain a flat substrate 203. The flat substrate 203 is pretreated (activated) using atmospheric pressure plasma, corona discharge, vacuum plasma etching, or the like.

Photocuring Resin Application Step

Figure 5:
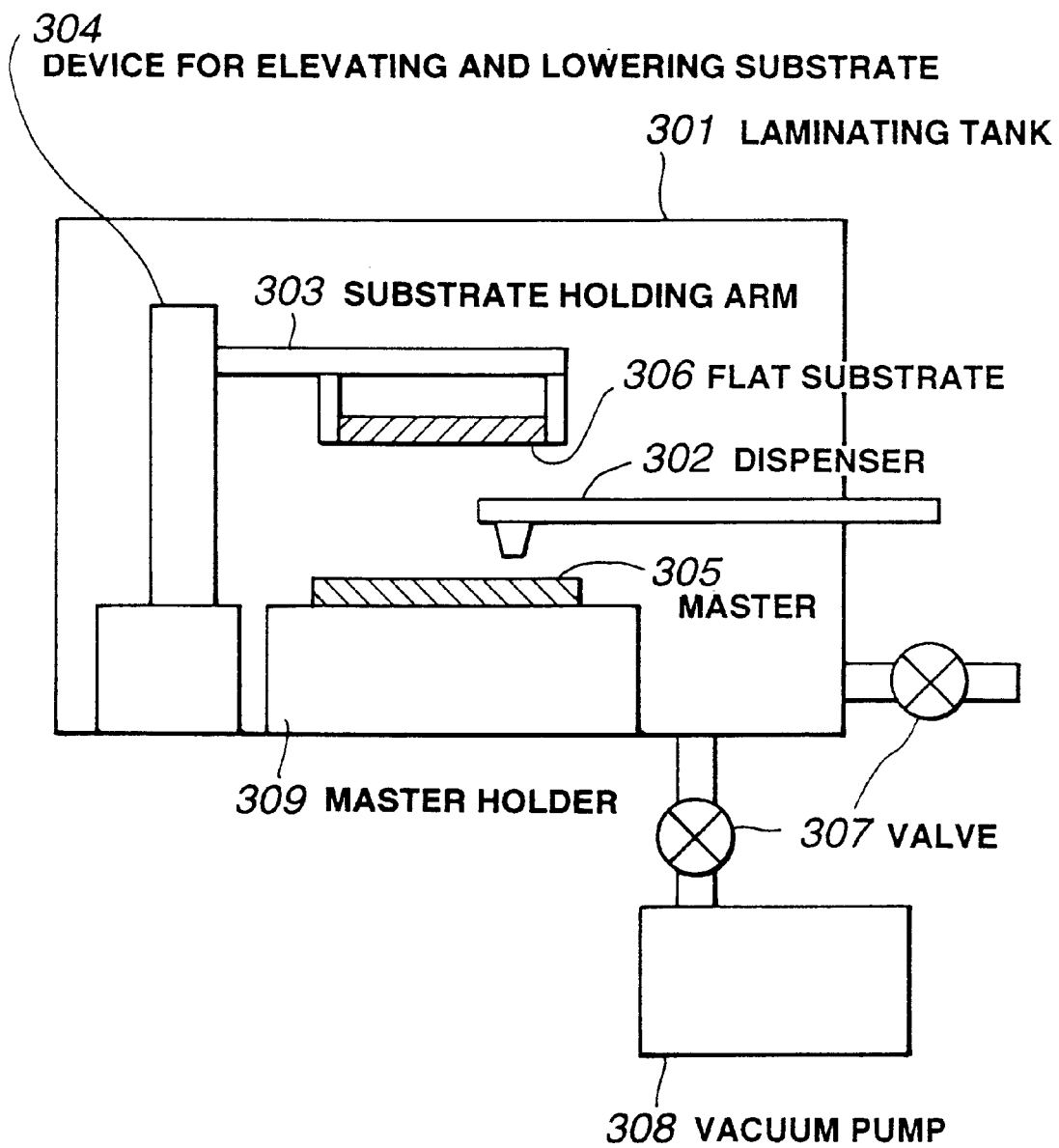
FIG. 5 is a schematic illustrating an example of a device used to apply and press the photocuring resin on the optical disk master in Embodiment 1 of the present invention.

FIG. 5 depicts an example of a device used to apply and press the photocuring resin on the optical disk master in the present embodiment. This device comprises: a master holder 309 on which the optical disk master 305 is placed; a dispenser 302 for applying the photocuring resin on the optical disk master 305 which has been placed on the master holder 309; a substrate holding arm 303 for holding a flat substrate 306 which is placed and pressed on the photocuring resin applied on the optical disk master 305; a device 304 for elevating and lowering the substrate holding arm, which moves the substrate holding arm 303 to and from the optical disk master 305; a laminating tank 301 in which these can be housed and sealed; a vacuum pump 308 which is connected to the laminating tank 301 and which reduces the pressure inside the laminating tank 301; and a valve 307 located between the laminating tank 301 and the vacuum pump 308.

In the present embodiment, the step of applying the photocuring resin by the dispenser 302 and of placing the substrate 306 on the optical disk master 305 is carried out at reduced pressure. Carrying out this step at reduced pressure can prevent bubbles from forming in the photocuring resin. After the substrate 306 has been placed on the optical disk master 305, the pressure can be returned to normal, to allow uniform pressure to be applied by atmospheric pressure, that is, to allow the substrate 306 to be uniformly pressed on the photocuring resin.

Figure 6:
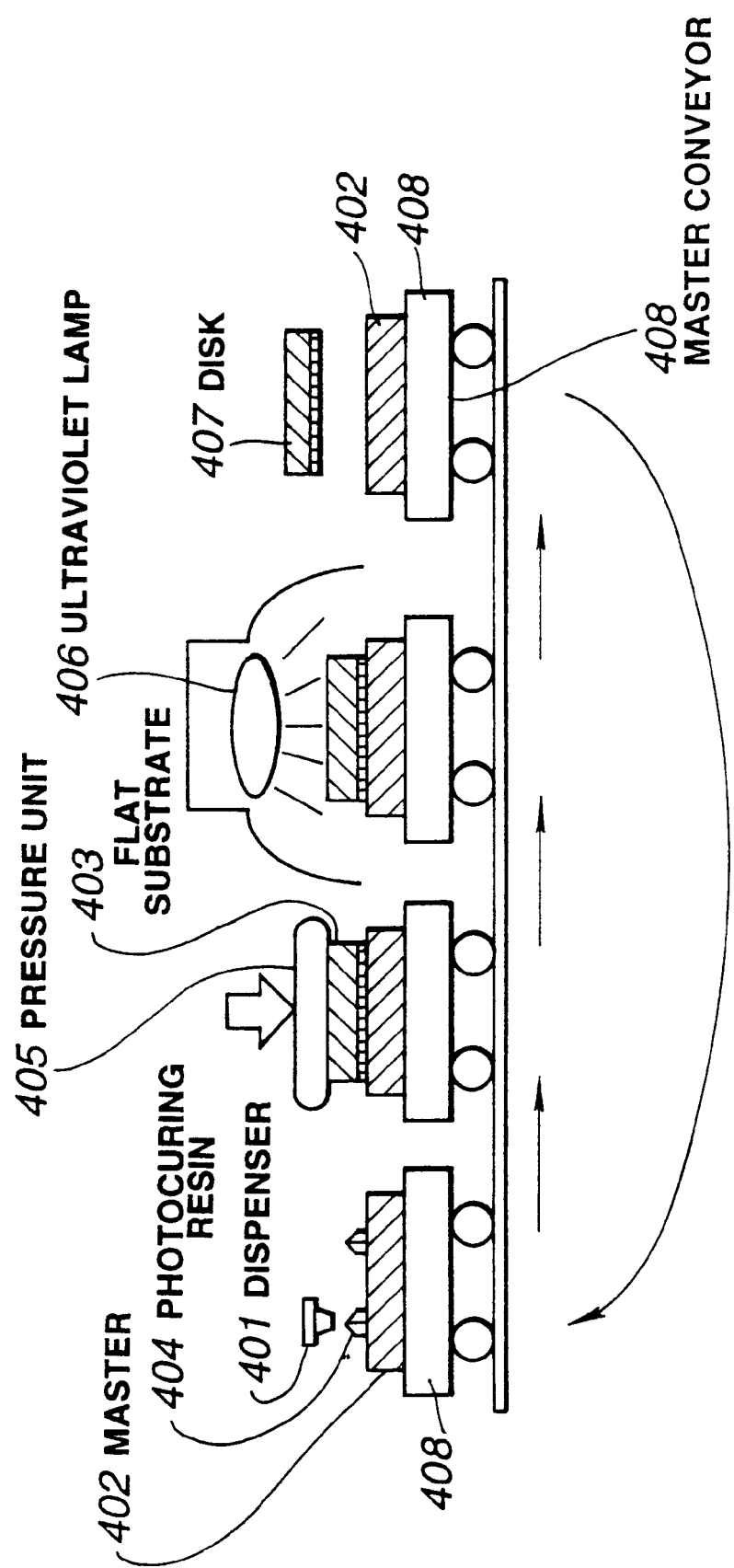
FIG. 6 is another schematic illustrating the step for applying the photocuring resin, pressing the substrate, and releasing the optical disk master in Embodiment 1 of the present invention.

FIG. 6 depicts the step for applying the photocuring resin by a different method than that above, the step for pressing the substrate, and the step for releasing the optical disk master. In FIG. 6, these steps are carried out in sequence from left to right in the direction indicated by the arrows.

Photocuring resin which has already been passed through a defoaming tank is applied using the dispenser 401 onto the optical disk master 402 placed on a master conveyor 408. A flat substrate 403 through which ultraviolet rays pass is then placed on the photocuring resin 404 and is mechanically pressed from above by a pressure unit 405. The pressure unit 405 is then removed, and ultraviolet rays are then radiated by an ultraviolet lamp 406 from above the substrate 403 to cure the photocuring resin. The substrate 403 to which the photocuring resin 404 adheres is then released from the optical disk master 402, resulting in a disk 407 with the prescribed pattern consisting of photocuring resin 404 formed on the substrate 403.

After the completion of this series of steps, the optical disk master 402 is placed as is on the moving master conveyor 408 and is returned to the first step to form another disk 407.

The photocuring resin was applied to the optical disk master side in the steps depicted in both FIGS. 5 and 6, but the photocuring resin may also be applied to the flat substrate side, and is not limited to the above. This has the advantage of shortening the time involving the optical disk master during these steps.

As described above, in Embodiment 1 of the present invention, the extrusion, pressing, and punching steps can be carried out continuously so as to increase the substrate manufacturing efficiency. There is no particular need for reheating during pressing or punching because pressing and punching are carried out continuously immediately following the extrusion molding which heats the sheet. The manufacturing equipment can be made more compact because a heating device can be dispensed with.

Because polyolefin polymers have low optical anisotropy, uniform optical properties are obtained along the entire surface of the sheet 200. The optical properties in particular are improved by the pressing step, so the optical properties of the sheet are better than those of glass and are ideal for optical disk substrates. Polyolefin polymers also have good compatibility with the photocuring resin and are capable of even further improvement in the optical disk precision and reliability.

The mechanical properties such as the slope warp or warpage (tilt) are also dependent on the molding conditions. Pressing is assumed to relax these mechanical properties immediately following extrusion molding. Compared to injection molded sheets, extrusion molded and pressed sheets thus have higher mechanical strength, making it possible to prevent deformation such as slope warp, warpage, or wrinkles in the substrate.

Sheet materials obtained by the extrusion molding and pressing of polyolefin polymers by the present manufacturing method have the good optical and mechanical properties described above, making them ideal not only for optical disk substrates but also for optical materials such as recording media and films.

EXAMPLES

The following example illustrates the relationship between the radial position (mm) and double refraction (nm) in a substrate (present invention) obtained by punching an extrusion molded polyolefin polymer sheet into the form of a disk, a substrate obtained by the extrusion molding of a polyolefin polymer (Comparative Product 1), and a substrate obtained by the extrusion molding of a polycarbonate (Comparative Product 2).

Figure 7A:
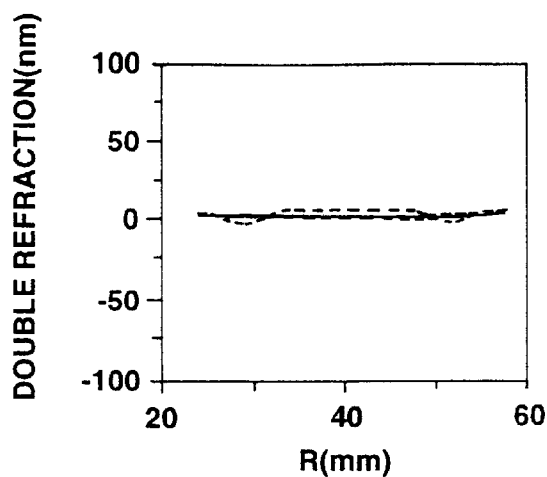
FIGS. 7A–7C depict the results of a study of the relationship between the radial position (mm) and the double refraction (nm) in the substrate in Embodiment 1 of the present invention and in Comparative Products 1 and 2; A illustrates the results for the substrate in Embodiment 1 of the present invention, B illustrates the results for Comparative Product 1, and C depicts the results for Comparative Product 2.
Figure 7B:
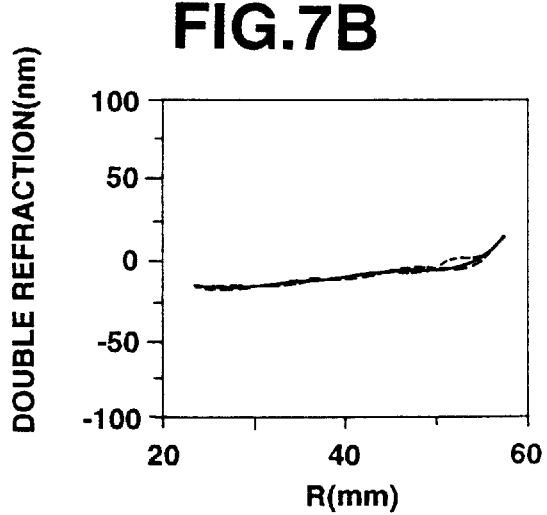
Figure 7C:
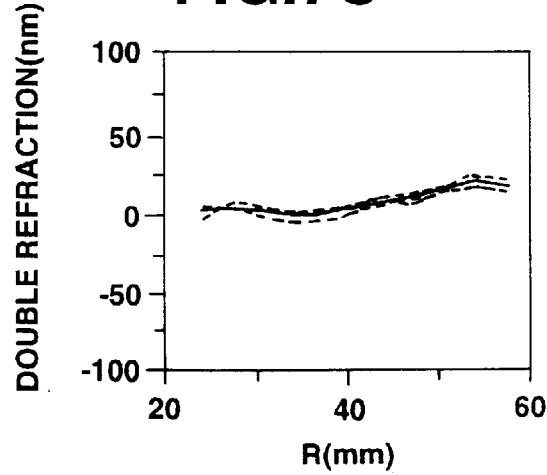

The results for the present invention are given in FIG. 7A, those for Comparative Product 1 are given in FIG. 7B, and those for Comparative Product 2 are given in FIG. 7C. The figures are plots of the maximum, mean, and minimum values in each radial position.

FIGS. 7A through C confirm that the absolute value for the double refraction in the radial direction was lower, at no more than 7 nm, in the product of the present invention than in the comparative products, and that there was less change in the double refraction according to the location on the disk. Here, the optical disk must have a low absolute value for the double refraction as well as little change in double refraction according to disk location because signals are detected by the rotation of the plane of polarization of the playback laser light. In the optical disk in the present embodiment, it may be seen that the absolute value for the double refraction in the horizontal direction is no more than 100 nm, and preferably no more than 50 nm, while that in the thicknesswise direction is no more than 20 nm, and preferably no more than 10 nm. It is thus evident that the product of the present invention provides better recording and playback properties (C/N) than the comparative products.

The relationship between radial position (mm) and the angle of inclination (degrees) was then studied in the product of the present invention and Comparative Products 1 and 2. The results for the present invention are given in FIG. 8A, those for Comparative Product 1 are given in FIG. 8B, and those for Comparative Product 2 are given in FIG. 8C. The figures are plots of the maximum, mean, and minimum values in each radial position.

Figure 8A:
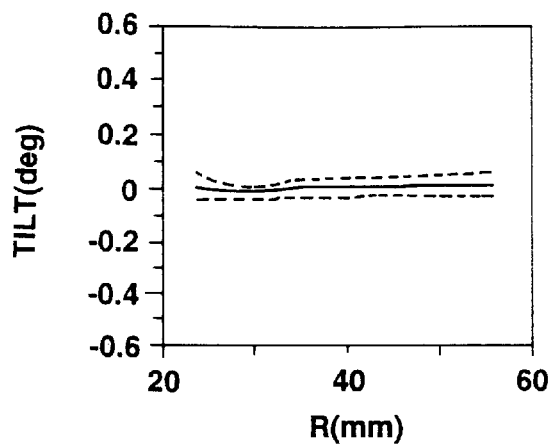
FIGS. 8A–8C depict the results of a study of the relationship between the radial position (mm) and the double refraction (nm) in the substrate in Embodiment 1 of the present invention and in Comparative Products 1 and 2; A illustrates the results for the substrate in Embodiment 1 of the present invention, B illustrates the results for Comparative Product 1, and C depicts the results for Comparative Product 2.
Figure 8B:
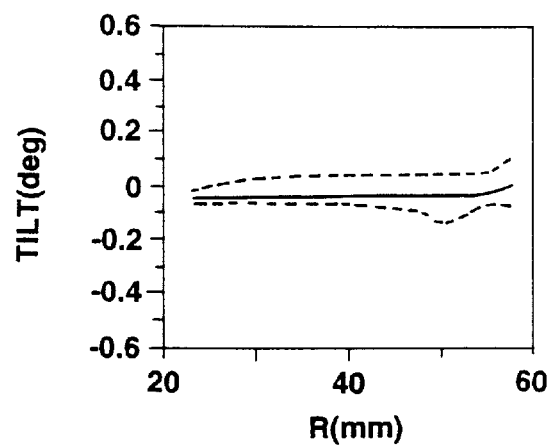
Figure 8C:
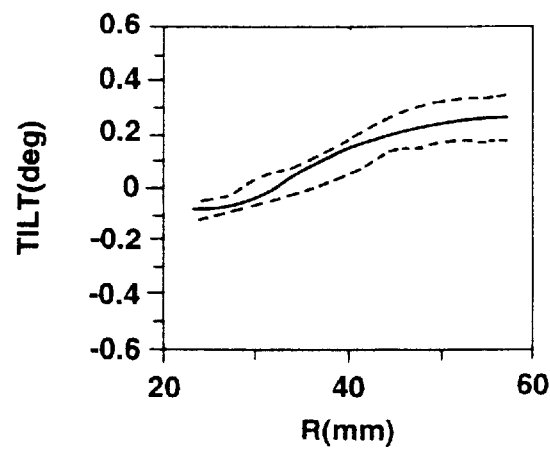

FIGS. 8A through C confirm that the absolute value for the angle of inclination in the radial direction was lower, at no more than 0.05 degrees, in the product of the present invention than in the comparative products, and that there was less change in the angle of inclination according to the location on the disk. Here, the angle of inclination, which is one of the mechanical properties of the substrate, must be low in order to provide stable recording and playback from the optical disk. In the optical disk in the present embodiment, it may be seen that the absolute value for the angle of inclination is no more than 100 nm, and preferably no more than 0.6 degrees, while the thicknesswise deformation is no more than 5%. It is thus evident that the product of the present invention provides better recording and playback properties (C/N) than the comparative products.

Figure 9:
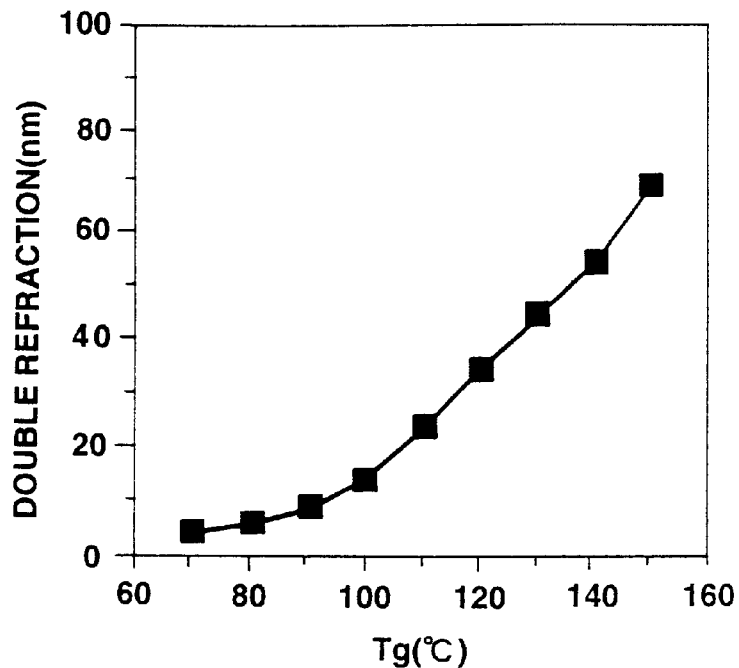
FIG. 9 depicts the results of a study of the relationship between the glass transition point Tg (° C.) and double refraction (nm) in the sheet material in Embodiment 1 of the present invention.
Figure 10:
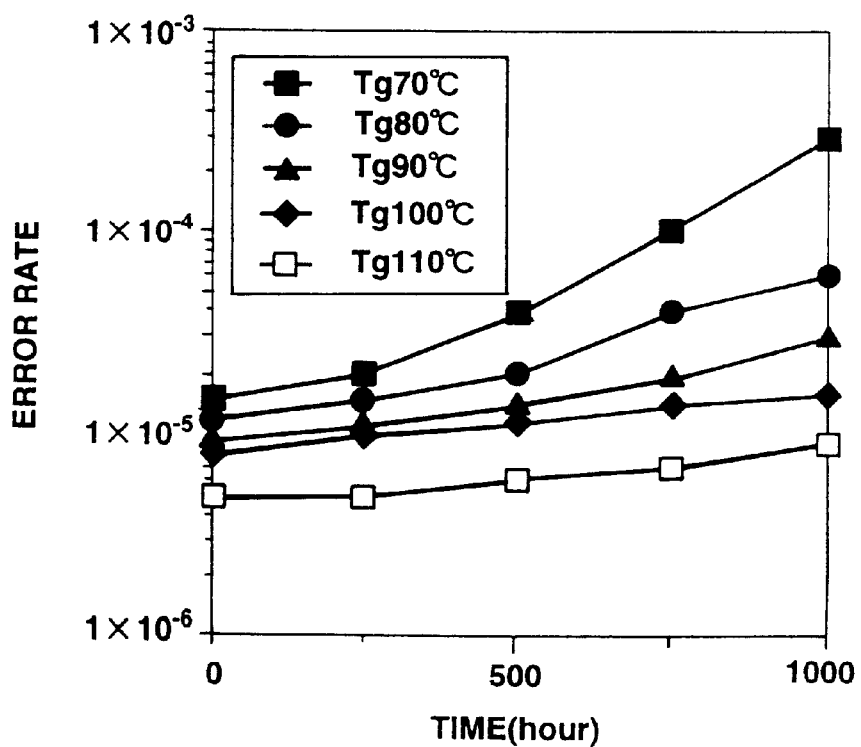
FIG. 10 depicts the results obtained in a test of the weather resistance of substrates with certain glass transition points.

FIG. 9 gives the results of a study of the relationship between the glass transition point Tg (° C.) and the double refraction (nm) in the aforementioned product of the present invention. FIG. 10 gives the results of a test of the weather resistance of substrates having certain glass transition points. The weather resistance test was carried out by studying the relationship between the error rate and time elapsed in an atmosphere with a temperature of 80° C. and a humidity of 85%.

Here, the glass transition point is a scale for assessing the heat resistance and weather resistance of a material, and these physical quantities characteristically changing discontinuously relative to the glass transition point. Problems in the heat resistance or weather resistance occur when the glass transition point is less than 80° C., whereas increases in the double refraction are a problem when the glass transition point is greater than 140° C. A glass transition point ranging from 80 to 140° C. affords good recording and playback properties as well as excellent heat resistance and weather resistance.

Measurement of the substrate 101 in the present embodiment revealed a transmissivity of at least 90%, demonstrating that the substrate 101 had a high degree of transparency. Measurement of the substrate 101 also revealed water absorption of no more than 0.01 wt % under conditions involving 24 hours at 23° C., and a moisture permeability coefficient of no more than 0.1 under conditions of 40° C. and 90%. It is thus evident that the substrate 101 in the present embodiment has low moisture absorption and moisture permeability. A study of the solvent resistance of the substrate 101 in the present embodiment using alcohols, esters, ketones, acid, alkalis, and the like revealed higher solvent resistance than the aforementioned Comparative Products 1 and 2.

Figure 11A:
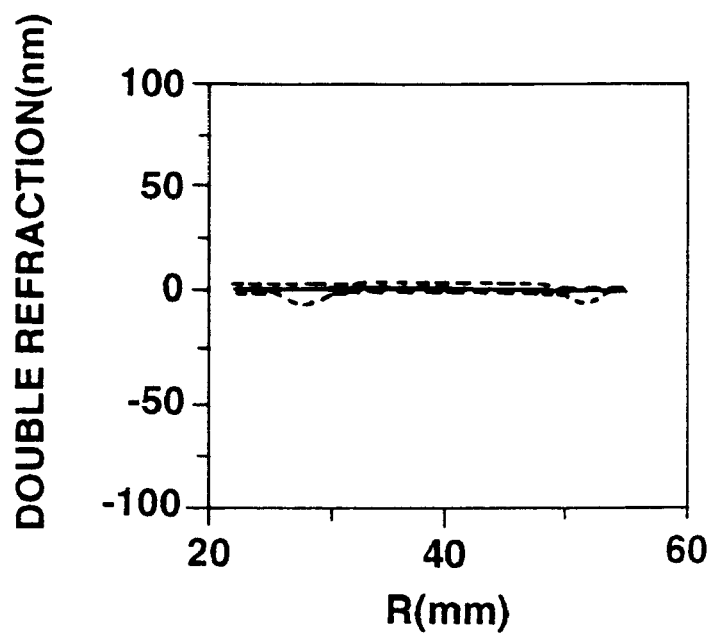
FIGS. 11A–11B depict the results obtained in the measurement of the double refraction of the sheet material in Embodiment 1 of the present invention; A depicts the results obtained in the pressing process of the present invention, and B depicts the results obtained in the absence of a pressing process.
Figure 11B:
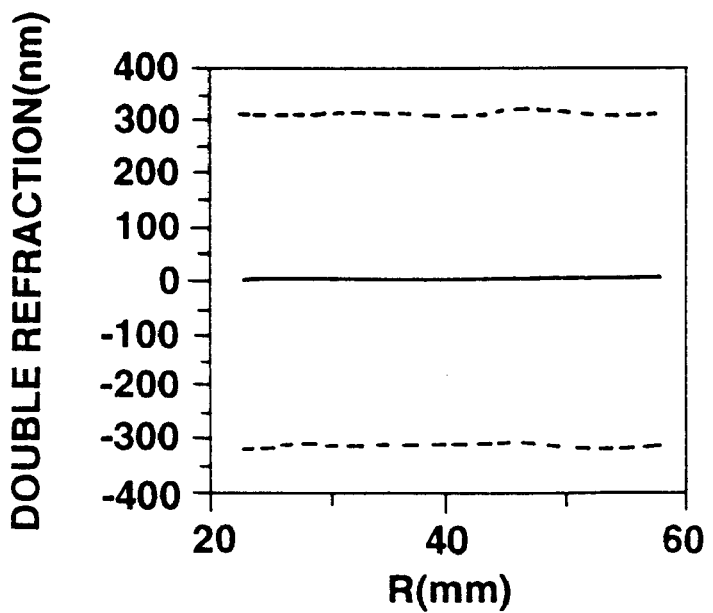
Figure 12A:
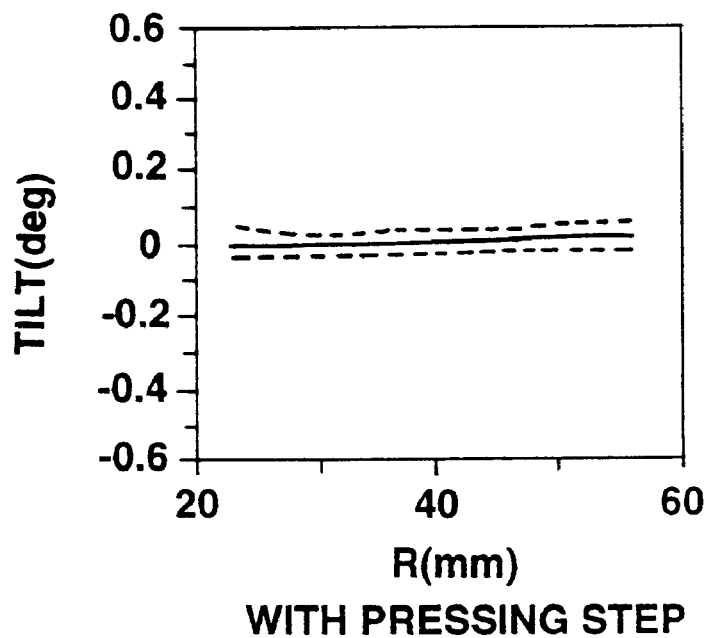
FIGS. 12A–12B depict the results obtained in the measurement of the warp angle (tilt) of the sheet material in Embodiment 1 of the present invention; A depicts the results obtained in the pressing process of the present invention, and B depicts the results obtained in the absence of a pressing process.
Figure 12B:
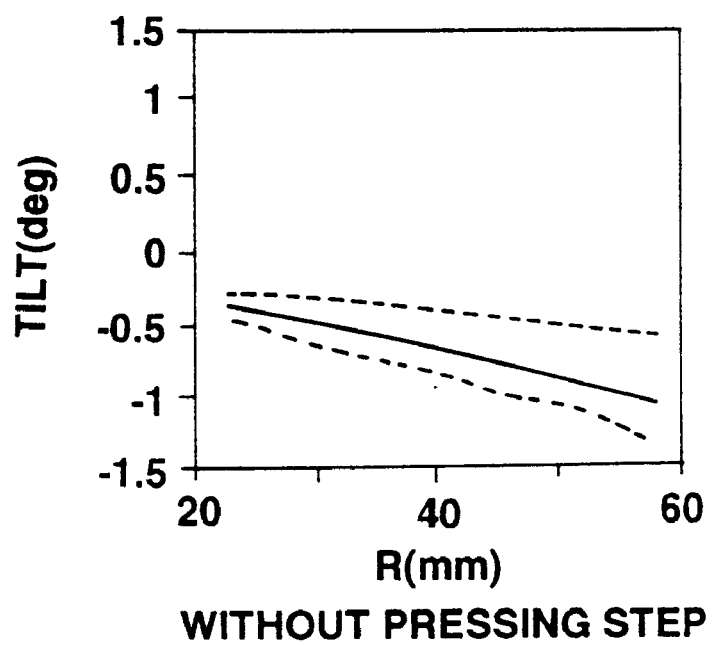

FIGS. 11 and 12 show a comparison of the properties obtained when the sheet (substrate) in the embodiment was and was not pressed. The figures are plots of the maximum, mean, and minimum values in each radial position.

FIG. 11A measures how much the double refraction changed depending on sheet location when the pressing step of the present embodiment was carried out. FIG. 11B is an example of the measurement of the double refraction when no pressing step was carried out. The figures demonstrate that the pressing step dramatically reduced the double refraction.

FIG. 12A measures how much the angle of inclination (tilt) changed depending on sheet location when the pressing step of the present embodiment was carried out. FIG. 11B is an example of the measurement of the angle of inclination when no pressing step was carried out. The figures demonstrate that the pressing step dramatically reduced the angle of inclination.

Embodiment 2

Embodiment 2 of the present invention is described below with reference to figures. FIG. 13 is a cross section depicting the steps for manufacturing the optical disk in Embodiment 2. A case in which the same optical disk as in Embodiment 1 is manufactured by other steps is described in the present embodiment. Parts that are the same as those in Embodiment 1 are indicated by the same symbols in the present embodiment and will not be described again.

Figure 13A:
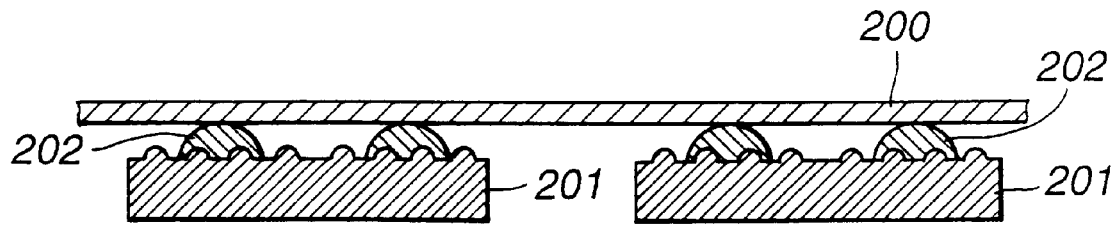
FIGS. 13A–13C are cross sections depicting the stages of the steps for manufacturing the optical disk in Embodiment 2 of the present invention; A illustrates the step for applying the photocuring resin, B illustrates the sheet pressing step, and C illustrates the master release step.

In the step depicted in FIG. 13A, masters 201 are prepared, and a photocuring resin 202 is applied on the plurality of masters 201. A sheet 200 is then placed on the photocuring resin 202. The sheet 200 is pretreated in the same manner as in Embodiment 1 using atmospheric pressure plasma, corona discharge, vacuum plasma etching, or the like.

Figure 13B:
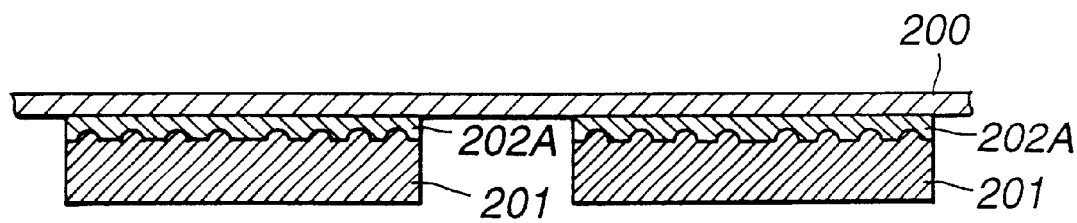

In the step depicted in FIG. 13B, the sheet 200 is pressed on the masters 201 with the photocuring resin 202 interposed therebetween. The photocuring resin 202 thus fills in the recesses of the bumps formed on the surface of the masters 201, and the bump configuration of the masters is accurately transferred to the photocuring resin 202. Ultraviolet rays are then radiated through the sheet 200 onto the photocuring resin 202 to cure the photocuring resin 202, and a photocuring resin layer 202A on which the aforementioned bump configuration has been formed is thus formed on the sheet 200.

Figure 13C:
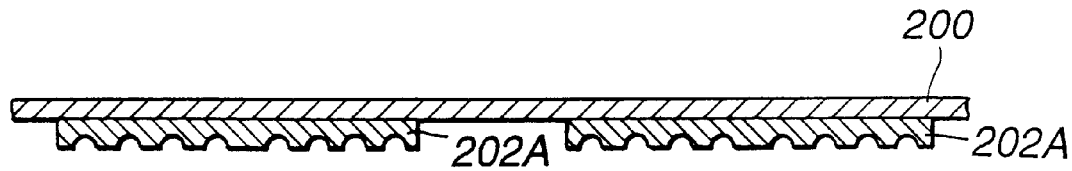

Then, in the step depicted in FIG. 13C, the masters 201 are released from the photocuring resin layer 202A. A reflecting film and a protective layer are then formed, and the sheet 200 on which they have been formed is punched into a disk to obtain an optical disk.

In the present embodiment, eccentricity can be easily reduced because the unmodified sheet is processed into a disk after film formation and patterning.

In Embodiments 1 and 2, cases involving the use of masters 201 consisting of silicon were described, but masters of any other material which can be used as masters to manufacture optical disks, such as nickel masters, may be used and are not limited to the above.

In Embodiments 1 and 2, cases in which the photocuring resin 202 was applied on the master 201 side were described, but the photocuring resin 202 may also be applied on the substrate 203 side or sheet 200 side, and is not limited to the above.

A thermosetting resin may be used instead of a photocuring resin, and heat of a desired temperature may be used instead of ultraviolet rays to cure the resin. Examples of photocuring resins include those consisting primarily of an acrylate or methacrylate and containing a photopolymerization initiator. Examples of thermosetting resins include those consisting primarily of epoxy resins or epoxy compounds.

Embodiment 3

Figure 14:
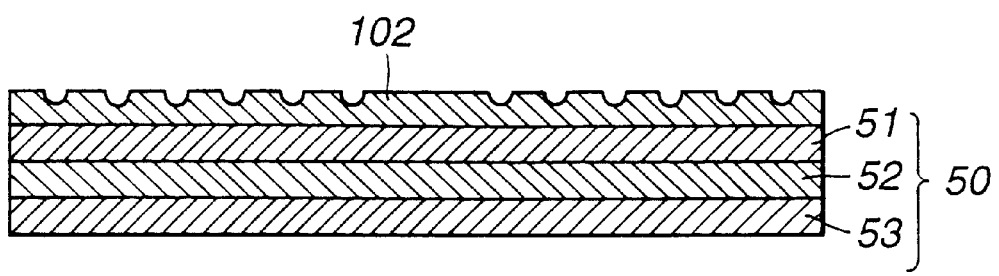
FIG. 14 is a cross section of the optical disk in Embodiment 3 of the present invention.

A third embodiment of the present invention is described below. FIG. 14 is a cross section of an optical disk in Embodiment 3. The symbols for the reflecting film, protective film, and the like are omitted in FIG. 14.

As shown in FIG. 14, the optical disk described in this embodiment differs from those described in Embodiments 1 and 2 in that the substrate 50 is a laminate featuring the lamination of three sheets 51 through 53 obtained by the extrusion molding of materials consisting primarily of polyolefin polymers.

Sheets 51 through 53 are composed of materials with differing molecular weights. Specifically, sheet 51 is composed of a material consisting primarily of a polyolefin polymer with a molecular weight of $1 \times 10^4$ to $5 \times 10^4$. Sheet 52 is composed of a material consisting primarily of a polyolefin polymer with a molecular weight of $8 \times 10^4$ to $2 \times 10^5$. Sheet 53 is composed of a material consisting primarily of a polyolefin polymer with a molecular weight of $3 \times 10^5$ to $8 \times 10^4$. This allows the mechanical strength of the substrate 50 to be further improved.

This embodiment was of a case of a substrate 50 constructed of a laminate which had been obtained by laminating 3 sheets 51 through 53 consisting of materials with mutually differing molecular weights, but a plurality of sheets constructed of materials with mutually differing glass transition points may also be laminated and are not limited to the above.

The number of sheets laminated can be determined as desired, provided that the performance of the optical disk substrate is not thereby compromised. The substrate thickness can be adjusted as desired by adjusting the number of sheets.

Embodiment 4

Figure 15:
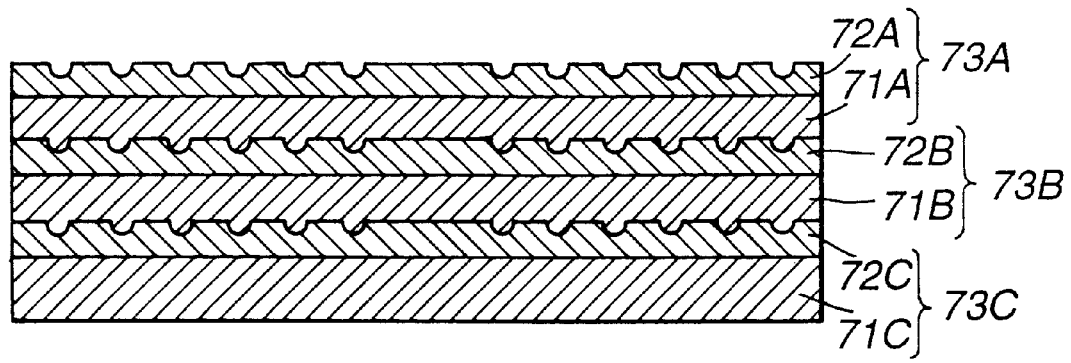
FIG. 15 is a cross section of the optical disk in Embodiment 4 of the present invention.

A fourth embodiment of the present invention is described below with reference to figures. FIG. 15 is a cross section of the optical disk in Embodiment 4. The symbols for the reflecting film, protective film, and the like are omitted in FIG. 15.

The optical disk depicted in FIG. 15 has a structure comprising the lamination of data recording substrates 73A (73B, 73C) composed of a substrate 71A (71B, 71C) obtained by punching an extrusion molded sheet of a material consisting primarily of a polyolefin polymer into a disk, and a photocuring resin layer 72A (72B, 72C) which is formed on the substrate 71A (71B, 71C) and on which a pattern (such as pits or grooves) is formed based on desired data.

Substrates 71A through 71C have different refractive indices. Specifically, substrate 71A has a refractive index of 1.40 to 1.45, substrate 71B has one of 1.50 to 1.55, and substrate 71C has one of 1.60 to 1.65. This allows a high precision optical disk to be obtained.

An optical disk with a structure comprising the lamination of 3 data recording substrates 73A through 73C was described in this embodiment, but two or four or more layers of data recording substrates may be laminated as desired, provided that the performance of the optical disk is not thereby compromised. The die can also be determined as desired.

Embodiment 5

A method for manufacturing (mastering) an optical disk master for forming a pattern on the optical disk of the present invention is described below with reference to figures. FIG. 16 is a cross section depicting the steps for manufacturing the optical disk master in the present invention.

Figure 16A:
FIGS. 16A–16F are cross sections depicting the steps for manufacturing the optical disk in Embodiment 5 of the present invention; A is a cross section of a silicon wafer, B illustrates the step for applying the photoresist, C illustrates the exposure step, D illustrates the development step, E illustrates the etching step, and F illustrates the step for removing the photoresist.

A silicon wafer 501 of a prescribed size is prepared in the step depicted in FIG. 16A. Then, in the step depicted in FIG. 16B, a positive photoresist 502 is applied by spin coating on the silicon wafer 501. Then, in the step depicted in FIG. 16C, the photoresist 502 applied in the previous step is heat treated (baked), and the photoresist 502 is exposed to a pattern based on desired data using a laser cutting machine. At this time, the laser cutting is carried out spirally from the inner periphery toward the outer periphery.

Figure 16B:
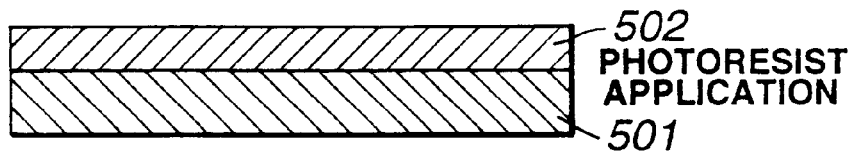
Figure 16C:
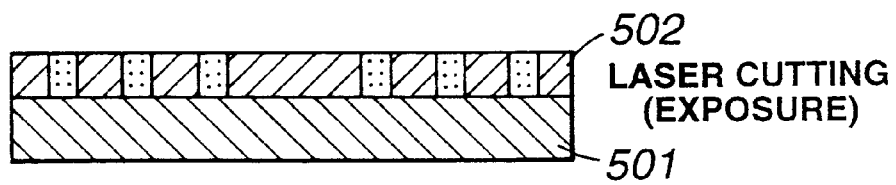
Figure 16D:
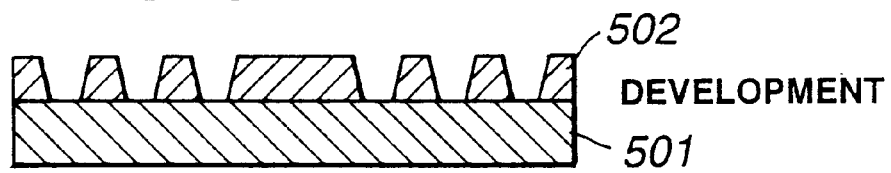
Figure 16E:
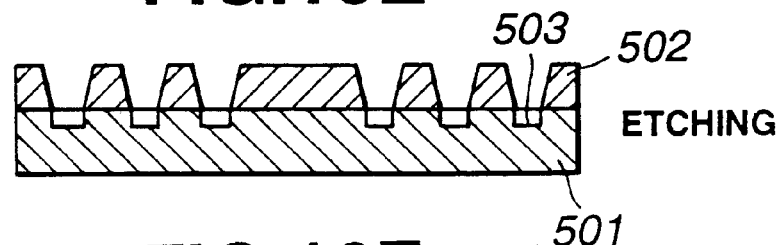
Figure 16F:

Then, in the step depicted in FIG. 16D, the exposed photoresist 502 is developed. A concave pattern based on desired data is formed in the photoresist 502 by this development. Then, in the step depicted in FIG. 16E, the photoresist 502 remaining from the step depicted in FIG. 16D is used as a mask for dry etching, and a concave component 503 is formed on the surface of the silicon wafer 501. The photoresist 502 is then removed in the step depicted in FIG. 16F. The data-based concave pattern is thus formed by these processes on a silicon wafer 501.

The photoresist 502 in the step depicted in FIG. 16B should have a certain thickness because it is ultimately used as a dry etching mask. In the preparation of conventional optical disk masters, photoresists are formed with a film thickness corresponding to the depth of the grooves or pits that have been formed. The film thickness thus ranged from about 0.1 to 0.2 $\mu$m. In the present embodiment, the etching of the silicon wafer corresponds to the conventional pit depth. In consideration, therefore, of the final substrate material refractive index, the optical depth is usually $\lambda/(4n)$ (where $\lambda$ is the wavelength, and n is the refractive index). Here, the pattern density can be improved by using a method such as that in Japanese Laid-Open Patent Applications 4-310624 and 4-311833, specifically, a method in which the photoresist development is weaker, resulting in less silicon wafer exposure, or a method in which cutting is carried out using optical super-resolution, similarly resulting in less silicon wafer exposure.

Embodiment 6

Another method for manufacturing an optical disk master for forming patterns on the optical disk in the present invention is described below with reference to figures. FIG. 17 is a cross section depicting other steps for manufacturing the optical disk master in the present invention.

Figure 17A:
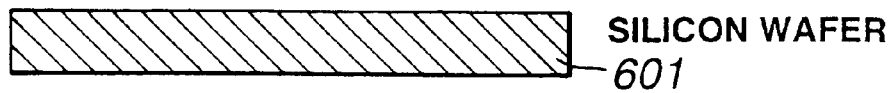
FIGS. 17A–17F are cross sections depicting other manufacturing steps for the optical disk in Embodiment 6; A is a cross section of a silicon wafer, B illustrates the step for applying the photoresist, C illustrates the exposure step, D illustrates the development step, E illustrates the etching step, and F illustrates the step for removing the photoresist.
Figure 17B:
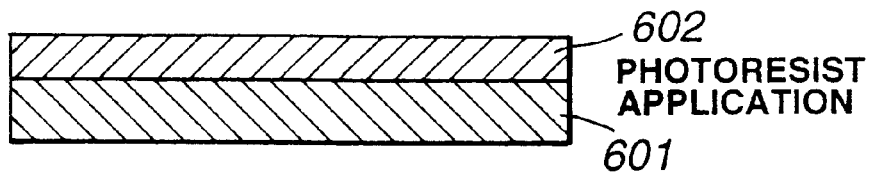
Figure 17C:
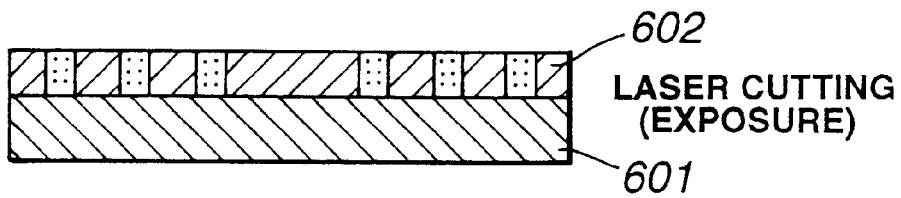

A silicon wafer 601 of a prescribed size is prepared in the step depicted in FIG. 17A. Then, in the step depicted in FIG. 17B, a negative photoresist 602 is applied by spin coating on the silicon wafer 601. Then, in the step depicted in FIG. 17C, the photoresist 602 applied in the previous step is heat treated (baked), and the photoresist 602 is then exposed to a pattern based on desired data using a laser cutting machine. At this time, the laser cutting is carried out spirally from the inner periphery toward the outer periphery.

Figure 17D:
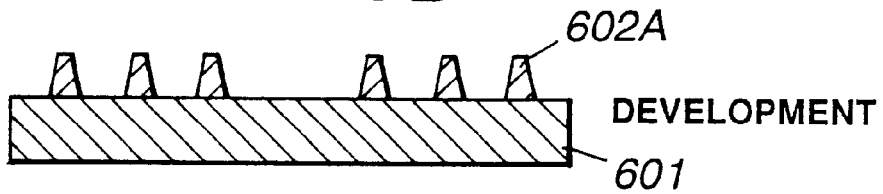
Figure 17E:
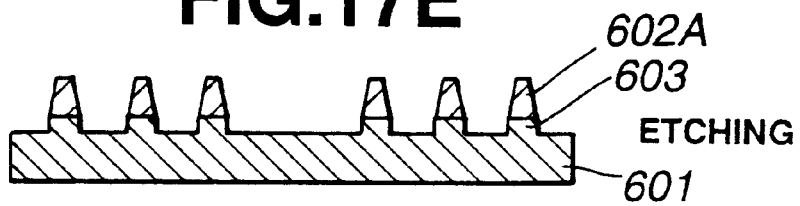

Then, in the step depicted in FIG. 17D, the exposed photoresist 602 is developed. A convex pattern 602A based on desired data is formed in the photoresist 602 by this development. Then, in the step depicted in FIG. 17E, the convex pattern 602A obtained in the step depicted in FIG. 17D is used as a mask for dry etching, and a convex component 603 is formed on the surface of the silicon wafer 601.

Figure 17F:
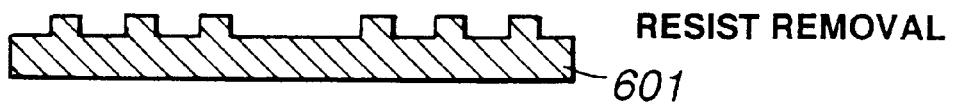

The convex pattern 602A used as the mask in the previous dry etching step is then removed in the step depicted in FIG. 17F. The data-based convex pattern is thus formed by these processes on a silicon wafer 601. The photoresist, whether negative or positive, must be at least 100 nm thick. This is because a lower thickness results in the disappearance of the resist patter in the dry etching step. A thickness of no more than 1 m is essential in view of the spin coating properties.

INDUSTRIAL APPLICABILITY

As described above, the optical disk pertaining to the present invention comprises a substrate obtained by processing an extrusion molded sheet of a material consisting primarily of a polyolefin polymer, allowing mass producibility to be improved and better optical properties, mechanical precision, and mechanical strength to be obtained.

The substrate film thickness can be readily controlled a laminated structure (multilayered structure) is created using the aforementioned substrate. The sheets constituting the aforementioned laminate can be constructed of materials having different molecular weights, so as to further improve the mechanical strength of the substrate in addition to the aforementioned merits.

The optical disk pertaining to the present invention can also have a structure featuring the lamination of a plurality of data recording substrates comprising the formation of the aforementioned data recording surface on a substrate obtained by processing the aforementioned extrusion molded sheet, wherein the substrates have mutually differing refractive indices, allowing the high precision to be achieved in addition to the aforementioned merits.

The method for manufacturing an optical disk pertaining to the present invention allows the optical disk pertaining to the present invention to be manufactured efficiently and with high precision.

Not only optical disks, but also sheet materials with dramatically improved optical and mechanical properties can be manufactured.

What is claimed is:

1. An optical disk, comprising:
    a substrate; and
    a data recording surface which is formed on said substrate and on which bumps have been formed based on prescribed data;
    wherein said substrate includes an extrusion molded sheet, of a material primarily including a polyolefin polymer, the material having been extruded in the form of a sheet, and having been subjected to pressure to change properties of the sheet, the properties including birefringement and warpage, and wherein said data recording surface includes a setting resin layer.

2. An optical disk as defined in claim 1, wherein the absolute value of the birefringement of said substrate in the horizontal direction is no more than 100 nm, and the absolute value of the birefringement in the thicknesswise direction is no more than 20 nm.

3. An optical disk as defined in claim 2, wherein the absolute value of said birefringement in the horizontal direction is no more than 50 nm, and the absolute value of the birefringement in the thicknesswise direction is no more than 10 nm.

4. An optical disk as defined in claim 1, wherein the absolute value of the angle of inclination of said substrate is no more than 0.6 degrees.

5. An optical disk as defined in claim 1, wherein the thicknesswise deformation of said substrate is no more than 5%.

6. An optical disk as defined in claim 1, wherein the glass transition point of said material is at least 80° C. and no more than 140° C.

7. An optical disk as defined in claim 1, wherein said substrate is obtained by processing a laminate, itself obtained by the lamination a plurality of said sheets, into the form of a disk.

8. An optical disk as defined in claim 7, wherein the materials constituting the sheets of said laminate have different glass transition points.

9. An optical disk as defined in claim 1, wherein the molecular weight of the material constituting the first sheet of said laminate is different from the molecular weight of the material constituting the second sheet laminated in contact with said first sheet.

10. An optical disk as defined in claim 1, wherein said setting resin layer consists of a photocuring resin layer or thermosetting resin layer.

11. A optical disk, comprising:
    a structure involving lamination of a plurality of sheets of data recording substrates furnished with a substrate, the substrate including an extrusion molded sheet, of a material primarily including a polyolefin polymer, the material having been molded in the form of a sheet, and having been subjected to pressure to change properties of the sheet, the properties including birefringement and warpage, and a data recording surface which includes a setting resin layer formed on said substrate and on which bumps have been formed based on prescribed data, wherein the refractive indices of said substrates are different from each other.

12. A method for manufacturing an optical disk furnished with a substrate and with a data recording surface which is formed on said substrate and on which bump shapes have been formed based on prescribed data, wherein said method for manufacturing an optical disk comprises the steps of:
    forming a material primarily including a polyolefin polymer into a sheet by extrusion molding;
    subjecting the sheet to pressure to change properties of the sheet, the properties including birefringement and warpage;
    forming said extrusion molded sheet;
    interposing a setting resin between said substrate surface and the bumpy surface of a master on which the negative pattern of said bumps has been formed, after said forming step;

placing or of placing and pressing the bumpy surface of the master of said substrate surface with said setting resin interposed therebetween; and curing said setting resin, after said placing step or placing and pressing step.

13. A method for manufacturing an optical disk as defined in claim 12, comprising the step of laminating a plurality of said sheets.

14. A method for manufacturing an optical disk as defined in claim 13, wherein said laminating step comprises a step in which a second sheet composed of a material with different molecular weight than that of the material constituting a first sheet is laminated on said first sheet.

15. A method for manufacturing an optical disk as defined in claim 13, wherein said laminating step comprises the step of laminating sheets consisting of materials with differing glass transition points.

16. A method for manufacturing an optical disk as defined in claim 12, wherein said master is made of silicon or nickel.

17. A method for manufacturing an optical disk as defined in claim 12, wherein the step of forming said sheet into the form of a sheet comprises a pressing step.

18. A method for manufacturing an optical disk as defined in claim 17, characterized in that said pressing method is carried out at a temperature of 100 to 200 degrees in the atmosphere or a nitrogen atmosphere.

19. A method for manufacturing an optical disk as defined in claim 17, characterized in that said pressing method involves a plurality of pressings.

20. A method for manufacturing an optical disk furnished with a substrate and with a data recording surface which is formed on said substrate and on which bump shapes have been formed based on prescribed data, wherein said method for manufacturing an optical disk comprises:

forming a material primarily including a polyolefin polymer into a sheet by extrusion molding;

subjecting the sheet to pressure to change properties of the sheet, the properties including birefringement and warpage;

interposing a setting resin between said substrate surface and the bumpy surface of a master on which the negative pattern of said bumps has been formed, after said sheet has been formed;

placing or of placing and pressing the bumpy surface of the master on said substrate surface with said setting resin interposed therebetween;

curing said setting resin, after said placing step or placing and pressing step; and processing said cured setting resin into the form of a disk.

21. A method for manufacturing a sheet material, comprising:

the step of forming a material primarily including a polyolefin polymer into the form of a sheet by extrusion molding; and a pressing step in which pressure is applied to the entire material formed into said sheet by the forming step so as to change properties of the sheet, the properties including birefringement and warpage.

22. A method for manufacturing a sheet material as defined in claim 21, characterized in that the pressing step is carried out at a temperature of 100 to 200 degrees in the atmosphere or a nitrogen atmosphere.

* * * * *

UNITED STATES PATENT AND TRADEMARK OFFICE
CERTIFICATE OF CORRECTION

PATENT NO. : 6,162,519
DATED : December 19, 2000
INVENTOR(S) : Atsushi TAKAKUWA; Takao NISHIKAWA; and Satoshi NEBASHI It is certified that error appears in the above-indentified patent and that said Letters Patent is hereby corrected as shown below:

IN THE TITLE:

Please amend the title to read as follows:

[54]  OPTICAL DISK, METHOD FOR MANUFACTURING SAME, AND METHOD FOR MANUFACTURING SHEET MATERIAL.

Signed and Sealed this

First Day of May, 2001

Attest:

NICHOLAS P. GODICI

*Attesting Officer*   *Acting Director of the United States Patent and Trademark Office*